US012759387B2

(12) United States Patent
Hausler

(10) Patent No.: US 12,759,387 B2
(45) Date of Patent: Oct. 13, 2026

(54) STRUCTURAL ASSEMBLY FOR AN ELECTRIC VEHICLE

(71) Applicant: Ford Global Technologies, LLC, Dearborn, MI (US)

(72) Inventor: Henry W. Hausler, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 18/650,756

(22) Filed: Apr. 30, 2024

(65) Prior Publication Data

US 2025/0332897 A1 Oct. 30, 2025

(51) Int. Cl.

*B60K 1/04* (2019.01)
*B60L 50/60* (2019.01)
*B62D 21/02* (2006.01)

(52) U.S. Cl.

CPC ................ *B60K 1/04* (2013.01); *B60L 50/66* (2019.02); *B60K 2001/0438* (2013.01); *B62D 21/02* (2013.01)

(58) Field of Classification Search

CPC ... B60K 1/04; B60K 2001/0438; B60L 50/66; B62D 21/02
USPC ........................................................ 180/68.5
See application file for complete search history.

(56) References Cited

U.S. PATENT DOCUMENTS 11,679,660 B2 * 6/2023 Alwan ..................... B60K 1/04 180/68.5
2009/0325049 A1 * 12/2009 Niedzwiecki ....... H01M 50/271 429/100
2018/0269441 A1 * 9/2018 Yum .................. H01M 50/262
2019/0184920 A1 * 6/2019 Chen ........................ B60R 16/04
2021/0050567 A1 * 2/2021 Pak ..................... H01M 50/209
2022/0388384 A1 * 12/2022 Alwan ..................... B60K 1/04

* cited by examiner

*Primary Examiner* — James A Shriver, II
*Assistant Examiner* — Hilary L Johns
(74) *Attorney, Agent, or Firm* — Burris Law, PLLC

(57) ABSTRACT

A structural assembly for an electric vehicle includes first and second longitudinal rails, a battery structure and a retaining element. The first longitudinal rail is opposite the second longitudinal rail and defines a slot. The battery structure is disposed between the first and second longitudinal rails and is configured to house power storage units. The battery structure includes a tab extending laterally outwardly from a first side of the battery structure. The tab received in the slot of the first longitudinal rail. The retaining element engages the second longitudinal rail and the second side of the battery structure and is configured to secure the second side of the battery structure to the second longitudinal rail.

20 Claims, 8 Drawing Sheets

STRUCTURAL ASSEMBLY FOR AN ELECTRIC VEHICLE

FIELD

The present disclosure relates to a structural assembly for an electric vehicle.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these issues related to the integration of rechargeable battery packs in electric vehicles.

SUMMARY

This section provides a general summary of the disclosure and is not a comprehensive disclosure of its full scope or all of its features.

In one form, the present disclosure provides a structural assembly for an electric vehicle. The structural assembly includes first and second longitudinal rails, a battery structure and a retaining element. The first longitudinal rail is opposite the second longitudinal rail and defines a slot. The battery structure is disposed between the first and second longitudinal rails and is configured to house power storage units. The battery structure includes a first tab extending laterally outwardly from a first side of the battery structure. The first tab is received in the slot of the first longitudinal rail. The retaining element engages the second longitudinal rail and the second side of the battery structure and is configured to secure the second side of the battery structure to the second longitudinal rail.

In variations of the structural assembly of the above paragraph, which can be implemented individually or in any combination: the battery structure includes a battery tray and a lid secured to the battery tray; a plurality of mechanical fasteners extend through the second longitudinal rail and the retaining element to secure the battery structure to the second longitudinal rail; the first longitudinal rail and the first tab do not include mechanical fasteners; a shape of the first tab corresponds to a shape of the slot; the retaining element extends an entire length of the battery structure; the battery structure includes a second tab extending laterally outwardly from a second side of the battery structure, the retaining element engages the second longitudinal rail and the second tab such that the second tab is disposed between the retaining element and the second longitudinal rail; the retaining element includes an upper portion that tapers inwardly; the battery structure includes a second tab extending laterally outwardly from a second side of the battery structure, the second tab includes an edge that corresponds to the tapered upper portion of the retaining element; the retailing element includes another upper end portion that tapers inwardly; and the second longitudinal rail includes another edge that corresponds to the another tapered upper end portion of the retaining element.

In another form, the present disclosure provides a structural assembly for an electric vehicle. The structural assembly includes first and second longitudinal rails, a battery structure and a retaining element. The first longitudinal rail is opposite the second longitudinal rail and defines a slot. The battery structure is disposed between the first and second longitudinal rails and is configured to house power storage units. The battery structure includes a first tab extending laterally outwardly from a first side of the battery structure and a second tab extending laterally outwardly from a second side of the battery structure. The first tab received in the slot of the first longitudinal rail. The retaining element engages the second longitudinal rail and the second tab of the battery structure and is configured to secure the second tab of the battery structure to the second longitudinal rail and the first tab of the battery structure to the first longitudinal rail. The slot of the first longitudinal rail defines a lower inclined surface and the first tab includes an edge that corresponds to the lower inclined surface of the slot.

In variations of the structural assembly of the above paragraph, which can be implemented individually or in any combination: a plurality of mechanical fasteners extending through the second longitudinal rail and the retaining element to secure the battery structure to the second longitudinal rail; the first longitudinal rail and the first tab do not include mechanical fasteners; the retaining element engages the second longitudinal rail and the second tab such that the second tab is disposed between the retaining element and the second longitudinal rail; the retaining element includes an upper portion that tapers inwardly; the second tab includes an edge that corresponds to the tapered upper portion of the retaining element; and the retailing element includes another upper end portion that tapers inwardly, the second longitudinal rail includes another edge that corresponds to the another tapered upper end portion of the retaining element.

In yet another form, the present disclosure provides a method for assembling a battery to a vehicle frame. The method includes moving the battery structure into a space defined between a first longitudinal rail and a second opposing longitudinal rail of the vehicle frame, inserting a first tab extending laterally outwardly from a first side of the battery structure into a slot defined in the first longitudinal rail, moving a retaining element into engagement with the second longitudinal rail and a second side of the battery structure, and securing the retaining element to the second longitudinal rail.

In variations of the method of the above paragraph, which can be implemented individually or in any combination: securing the retaining element to the second longitudinal rail moves the first tab further into the slot of the first longitudinal rail and securing the retaining element to the second longitudinal rail includes extending a plurality of mechanical fasteners through the second longitudinal rail and the retaining element.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
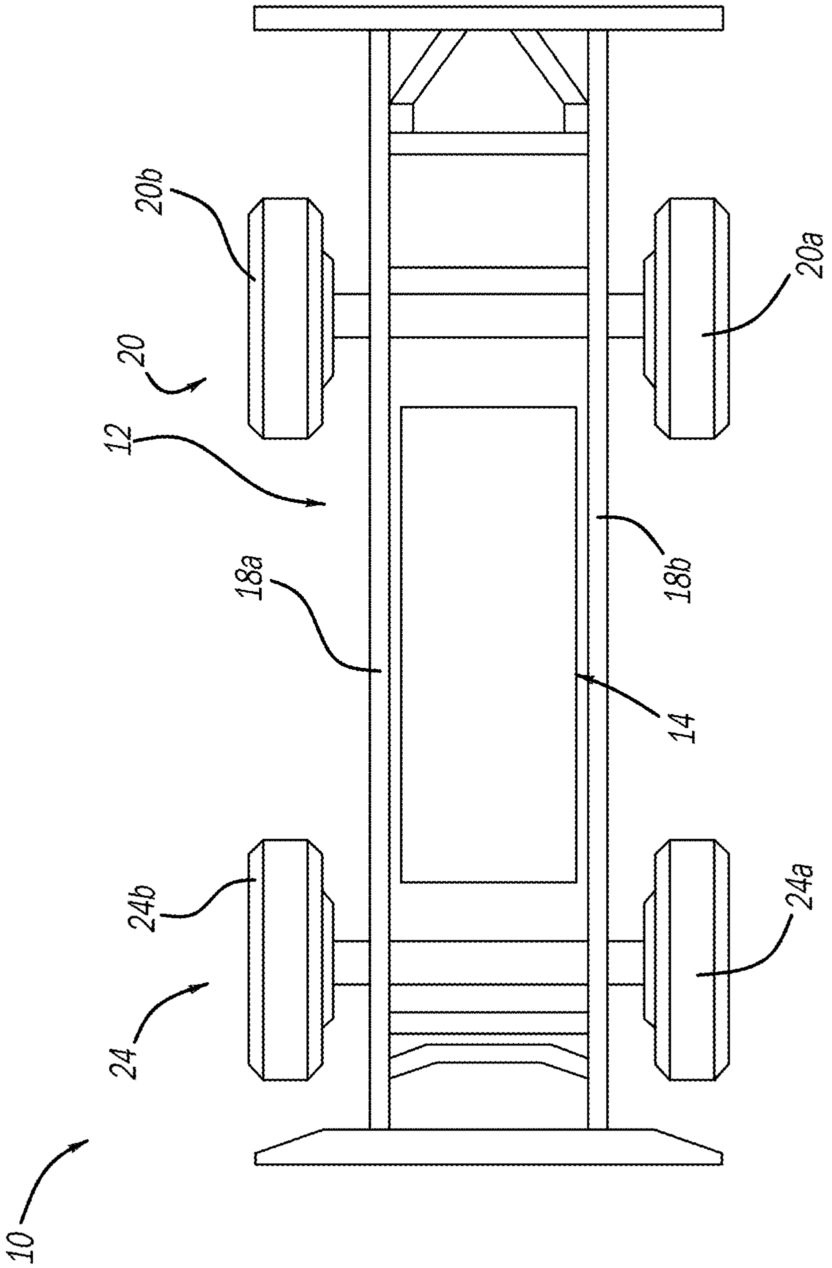
FIG. 1 is a schematic view of a vehicle including a battery housing assembly and a vehicle frame according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
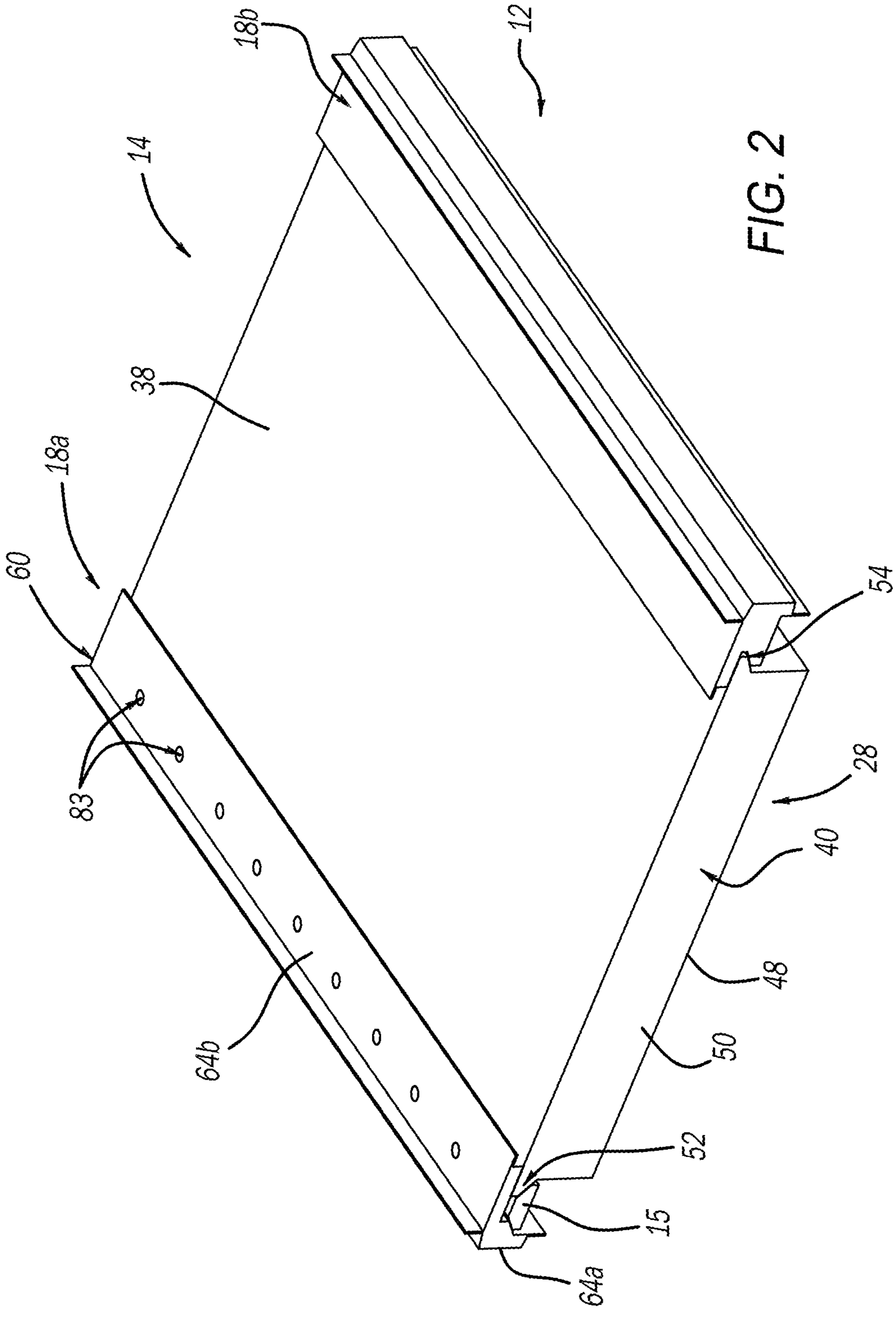
FIG. 2 is a perspective view of a portion of the vehicle frame and the battery housing assembly of FIG. 1.

With reference to FIGS. 1 and 2, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12, a battery housing assembly or battery structure 14, and an elongated retaining element 15 (FIG. 2). The vehicle frame 12 is the main supporting structure of the vehicle 10, to which various components are attached either directly or indirectly. The vehicle frame 12 includes opposed longitudinal rails 18*a*, 18*b*. The rails 18*a*, 18*b* are spaced apart from each other and may establish a length of the vehicle frame 12.

With reference to FIGS. 2-5, the rail 18*a* includes an L-shaped portion 60 defining a space 62 (FIG. 4) that a portion of the battery housing assembly 14 is received in. The L-shaped portion 60 includes a vertical wall 64*a* and a horizontal wall 64*b* extending perpendicularly from the vertical wall 64*a*. The vertical wall 64*a* is spaced apart from the battery housing assembly 14 and includes an outer side 66*a* (FIG. 4) that faces away from the battery housing assembly 14 and an inner side 66*b* (FIG. 4) that faces toward the battery housing assembly 14. As shown best in FIG. 4, the inner side 66*b* includes an inner surface or profile 68 that has a first vertical portion 68*a*, a second vertical portion 68*b*, and an inclined portion 68*c*. The second vertical portion 68*b* is located above the first vertical portion 68*a* and located above the inclined portion 68*c*. The second vertical portion 68*b* is also located further inboard (i.e., closer toward the battery housing assembly 15) than the first vertical portion 68*a*. In the example illustrated, the first vertical portion 68*a* extends a greater distance in the vertical direction than the second vertical portion 68*b*. In some forms, the second vertical portion 68*b* extends a greater distance in the vertical direction than the first vertical portion 68*a*. The inclined portion 68*c* is positioned between the first vertical portion 68*a* and the second vertical portion 68*b* and extends upwardly and inwardly from the first vertical portion 68*a* toward the second vertical portion 68*b*.

The horizontal wall 64*b* extends inwardly from an upper end of the vertical wall 64*a* and covers an upper portion or edge of the battery housing assembly 14. In the example illustrated, the horizontal wall 64*b* includes an upper side 70*a* that faces away from the battery housing assembly 14 and a lower side 70*b* that faces toward the battery housing assembly 14. The lower side 70*b* includes a lower surface or profile 72 that engages the upper portion of the battery housing assembly 14. In the example illustrated, the lower surface 72 is flat. The horizontal wall 64*b* also includes a plurality of apertures 75 (FIG. 3) extending therethrough. The apertures 75 are aligned along the length of the rail 18*a* from a front end 83*a* of the rail 18*a* toward a rear end 83*b* of the rail 18*a*.

Figure 4:
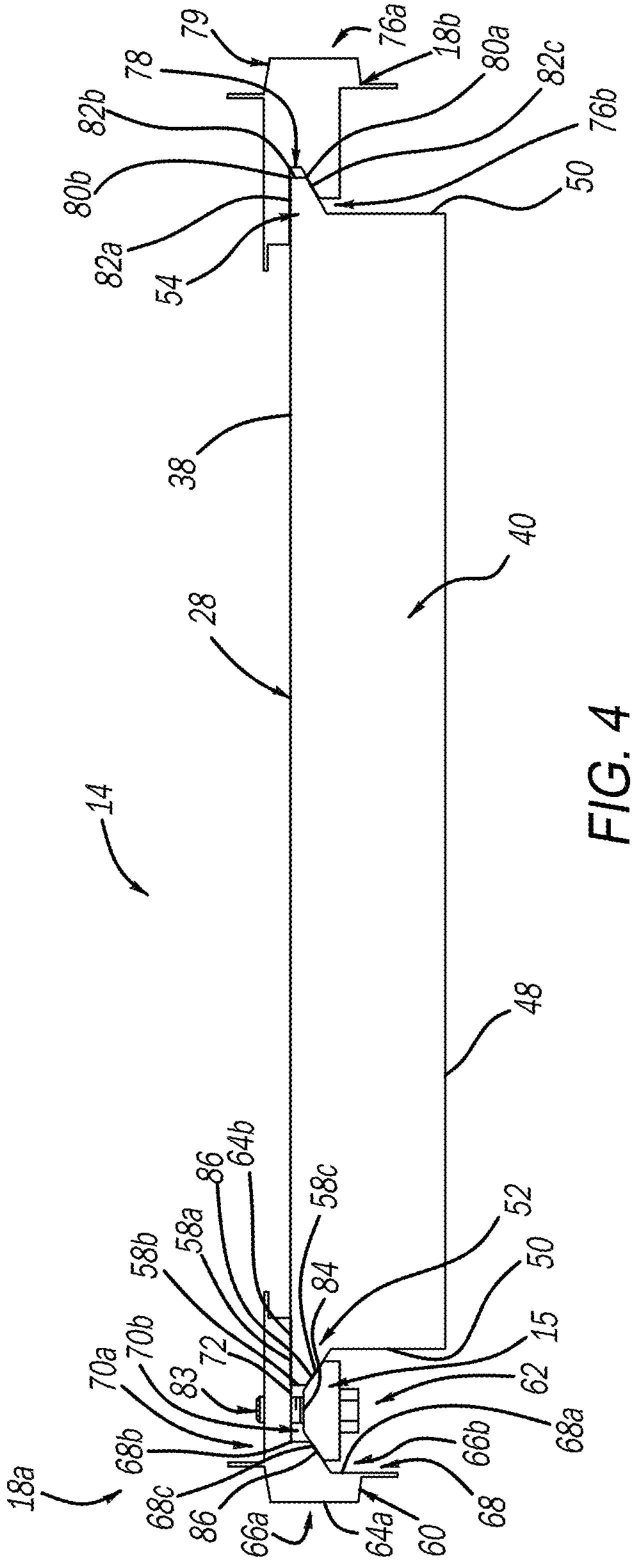
FIG. 4 is a cross-sectional view of a portion of the vehicle frame and the battery housing assembly of FIG. 1.

With reference to FIG. 4, the rail 18*b* includes a section 79 that has an outer side 76*a* that faces away from the battery housing assembly 14 and an inner side 76*b* that faces toward the battery housing assembly 14. The rail 18*b* includes a slot 78 formed therein that receives a portion of the battery housing assembly 14. The slot 78 opens through to the inner side 76*b* of the rail 18*b*. The slot 78 also defines a lower surface 80*a* and an upper surface 80*b*. In the example illustrated, the lower surface 80*a* is inclined and the upper surface 80*b* is flat. That is, the lower surface 80*a* inclines upward and outwardly from the inner side 76*b* of the rail 18*b* toward the outer side 76*a* of the rail 18*b*. In some forms, the lower surface 80*a* may be flat and the upper surface 80*b* may be inclined. In other configurations, the lower surface 80*a* may be inclined and the upper surface 80*b* may also be inclined.

In some forms, the L-shaped portion 60 may be a separate component that is secured to the rail 18*a* using mechanical fasteners, adhesives, or any other suitable attachment means. Similarly, the section 79 may be a separate component that is secured to the rail 18*b* using mechanical fasteners, adhesives, or any other suitable attachment means. In this way, the structural assembly of the present disclosure may be retrofitted onto electric vehicles already manufactured. In the example illustrated, the electric vehicle is a body-on-frame vehicle. In some forms, the electric vehicle may be of a uni-body architecture where the L-shaped portion 60 and the section 79 are part of rockers or sills, for example.

With reference back to FIG. 1, the battery housing assembly 14 powers a rear motor (not shown) to drive rear wheels 20*a*, 20*b* of a set of rear wheels 20 via a rear axle. Similarly, the battery housing assembly 14 powers a front motor (not shown) to drive front wheels 24*a*, 24*b* of a set of front wheels 24 via a front axle.

Figure 3:
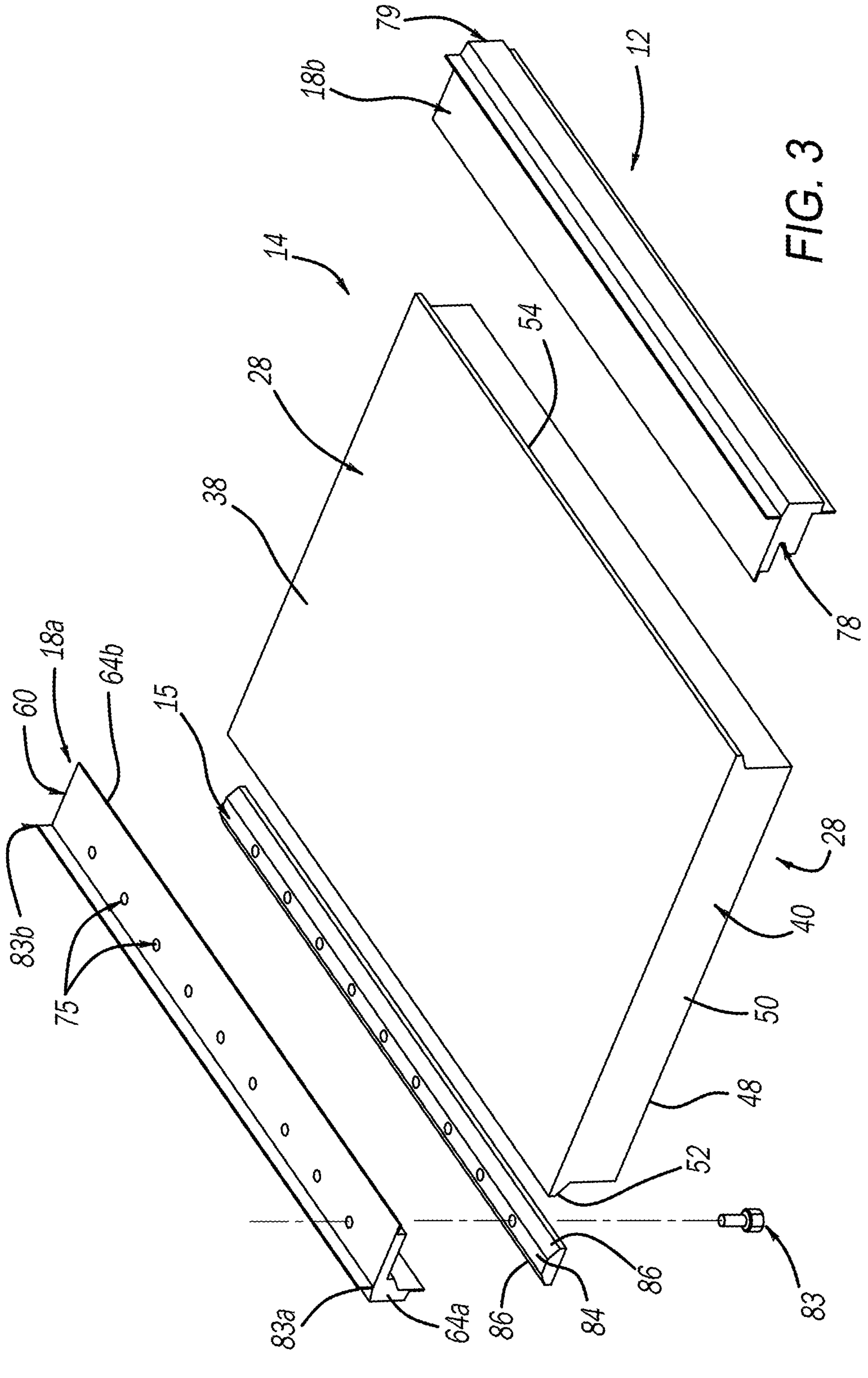
FIG. 3 is an exploded view of a portion of the vehicle frame and the battery housing assembly of FIG. 1.
Figure 5:
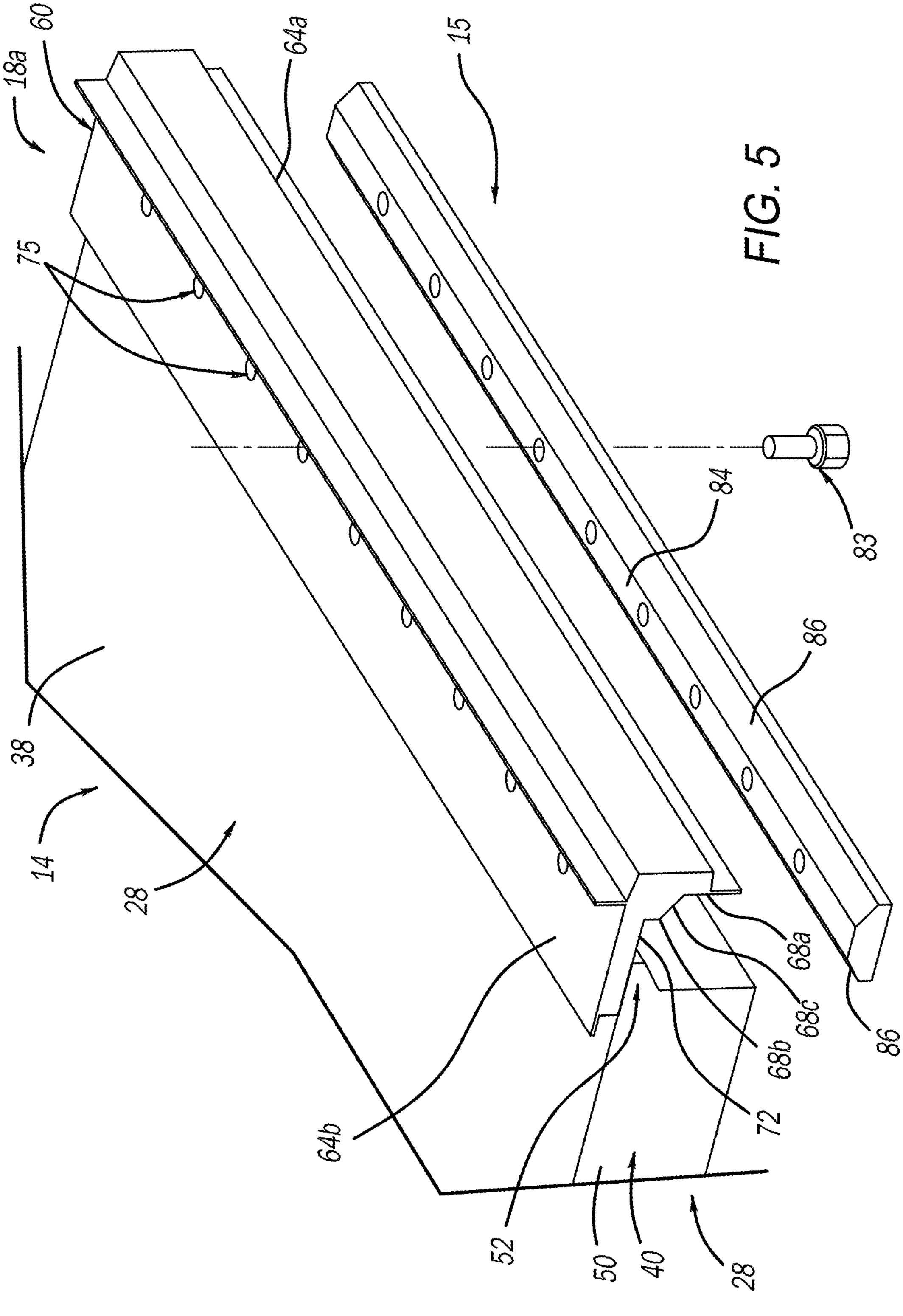
FIG. 5 is a perspective view of a portion of the vehicle frame and a portion of the battery housing assembly of FIG. 1 with a retaining element exploded from the portion of the vehicle frame and the battery housing assembly.

With reference to FIGS. 2, 3 and 5, the battery housing assembly 14 includes one or more battery arrays or power storage units (not shown) and a battery tray or housing 28. The battery housing 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units. In some forms, the battery arrays are stacked on top of each other.

The battery housing 28 may disposed at various locations of the vehicle 10 and is mounted to the vehicle frame 12. In this way, the battery housing 28 is supported by the vehicle frame 12 and is remote from a passenger cabin (not shown) and cargo compartments (not shown) of the vehicle 10, therefore, not occupying space that would otherwise be available for passengers or cargo. In the example illustrated, the battery housing 28 is disposed between the rails 18*a*, 18*b* and includes a cover or lid 38 (shown schematically), a body 40, and a seal (not shown). The lid 38 is removably coupled to the body 40 via mechanical fasteners such as bolts or screws (not shown), for example. In this way, the lid 38 may be removed to service the battery arrays disposed within the battery housing 28.

The body 40 includes a bottom wall or panel 48 and one or more side walls or panels 50. The bottom wall 48 supports the battery arrays disposed within the battery housing 28 and is secured to lower portions of the side walls 50. For example, the bottom wall 48 is secured to the lower portions of the side walls 50 via welding, an adhesive, or any other suitable attachment means. The side walls 50 are manufactured via stamping, for example, and extend in a vertical direction. The side walls 50 define an outer boundary of the body 40 and are secured to each other via welding or an adhesive, for example. The seal is disposed around a periphery of the side walls 50 of the battery housing 28 and is engaged with side walls 50 and the lid 38. In this way, fluids, debris and other materials are inhibited from entering into the battery housing 28.

The battery housing 28 includes a first tab 52 and a second tab 54. The first tab 52 extends laterally outwardly from a first side of the battery housing 28 and is received in the space 62 of the rail 18*a*. In the example illustrated, the first tab 52 is spaced apart from the inner surface 68 of the rail 18*a* and is engaged with the retaining element 15 as will be described in more detail below. As best shown in FIG. 4, the first tab 52 includes an upper surface 58*a*, a vertical surface 58*b*, and an inclined surface 58*c*. The upper surface 58*a* is flat and engages the lower surface 72 of the rail 18*a*. The vertical surface 58*b* is located above the inclined surface 58*c* and is located above the retaining element 15. The inclined surface 58*c* extends upward and outwardly from the side wall 50 of the battery housing 28 toward the vertical surface 58*b*. The inclined surface 58*c* engages the retaining element 15 such that the second tab 54 of the battery housing 28 is urged or forced into the slot 78 of the rail 18*b* as will be described in more detail below.

The second tab 54 extends laterally outwardly from a second side of the battery housing 28 and is securely received in the slot 78 of the rail 18*b*. In this way, the battery housing 28 is secured to the rail 18*b* without mechanical fasteners as will be described in more detail below. The second tab 54 includes an upper surface 82*a*, a vertical surface 82*b*, and an inclined surface 82*c*. The upper surface 82*a* engages the upper surface 80*b* of the slot 78 and has a shape that corresponds to a shape of the upper surface 80*b* of the slot 78. In the example illustrated, the upper surface 82*a* is flat to correspond the flat surface of the upper surface 80*b* of the slot 78. The vertical surface 82*b* is located above the inclined surface 82*c*. The inclined surface 82*c* engages the lower surface 80*a* of the slot 78 and has a shape that corresponds to the shape of the lower surface 80*a* of the slot 78. The inclined surface 82*c* extends upward and outwardly from the side wall 50 of the battery housing 28 toward the vertical surface 82*b*. In some forms, the first and second tabs 52, 54 are formed by a combination of the lid 38 and the body 40 (e.g., the lid 38 forms portions of the upper surfaces 58*a*, 82*a* of the first and second tabs 52, 54, respectively). In other forms, the first and second tabs 52, 54 are formed only by the body 40 (e.g., the lid 38 does not form portions of the upper surfaces 58*a*, 82*a* of the first and second tabs 52, 54, respectively).

With reference to FIGS. 3-5, the retaining element 15 is made of a metal material such as aluminum, for example, and is located inboard relative to the vertical wall 64*a* of the rail 18*a*. Stated differently, the retaining element 15 is positioned between the vertical wall 64*a* of the rail 18*a* and the battery housing 28. In the example illustrated, the retaining element 15 extends an entire length of the battery housing 28 (FIGS. 3 and 5). In some forms, the retaining element 15 extends only a portion of the battery housing 28.

In the example illustrated, the retaining element 15 is a solid structure and is generally a rectangular shape. In some forms, the retaining element 15 may include a hollow structure. In the example illustrated, the retaining element 15 includes a planar upper surface 84 and a pair of upper end portions or surfaces 86. The retaining element 15 also includes a reduced cross-sectional area proximate the end that attaches to the rail 18*a* (e.g., proximate the upper end). A plurality of mechanical fasteners 83 (FIG. 2) extend through the planar upper surface 84 and the horizontal wall 64*b* of the rail 18*a*, thereby securing the retaining element 15 to the rail 18*a*. In some forms, the upper surface 84 is arcuate or curved, for example, as opposed to planar. When the retaining element 15 and the rail 18*a* are secured to each other, the planar upper surface 84 is spaced apart from the horizontal wall 64*b* of the rail 18*a* and the pair of upper end portions 86 engage the inclined surfaces 58*c*, 68*c*. The upper end portions 86 are tapered inwardly and have a shape that corresponds to the surfaces 58*c*, 68*c*. In this way, the retaining element 15 may force or urge the second tab 54 of the battery housing 28 into the slot 78 of the rail 18*b* when the retaining element 15 is secured to the rail 18*a*.

The upper end portions 86 of the retaining element 15 provide the benefit of facilitating coupling of the battery housing 28 to the rail 18*b* without the use of mechanical fasteners extending through the rail 18*b* and the battery housing 28. In this way, the number of mechanical fasteners used to secure the battery housing 28 to the vehicle frame 12 is reduced. In the example illustrated, the upper end portions 86 of the retaining element are tapered along an entire length of the retaining element 15. In some configurations, the upper end portions 86 of the retaining element 15 are tapered only at opposing ends of the retaining element 15. In other configurations, the upper end portions 86 of the retaining element 15 are tapered along some portions of the retaining element 15 and are square-cut, for example, along other upper end portions of the retaining element.

Figure 6A:
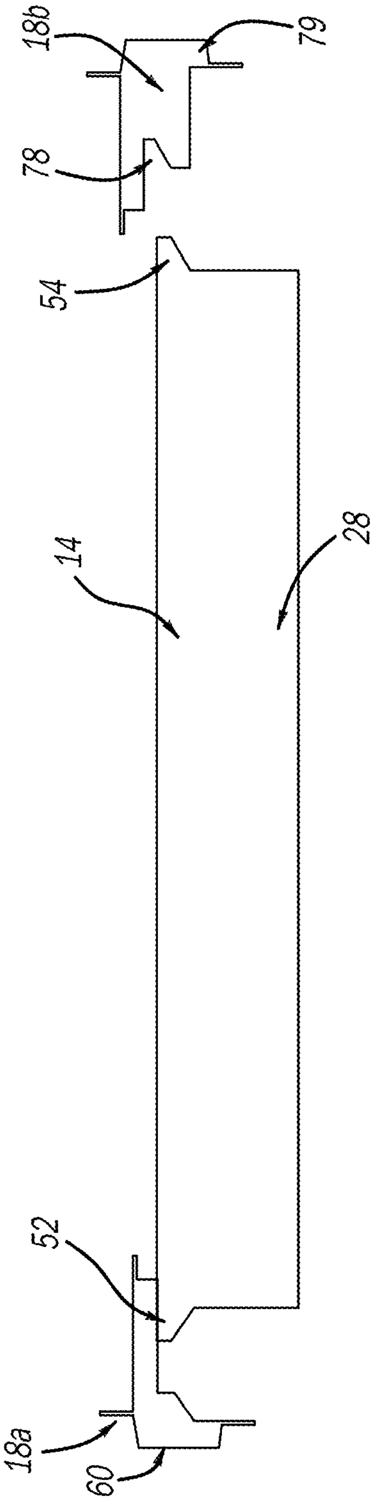
FIGS. 6A-6D are cross-sectional views of the battery housing assembly of FIG. 1 being assembled to the vehicle frame of FIG. 1.
Figure 6B:
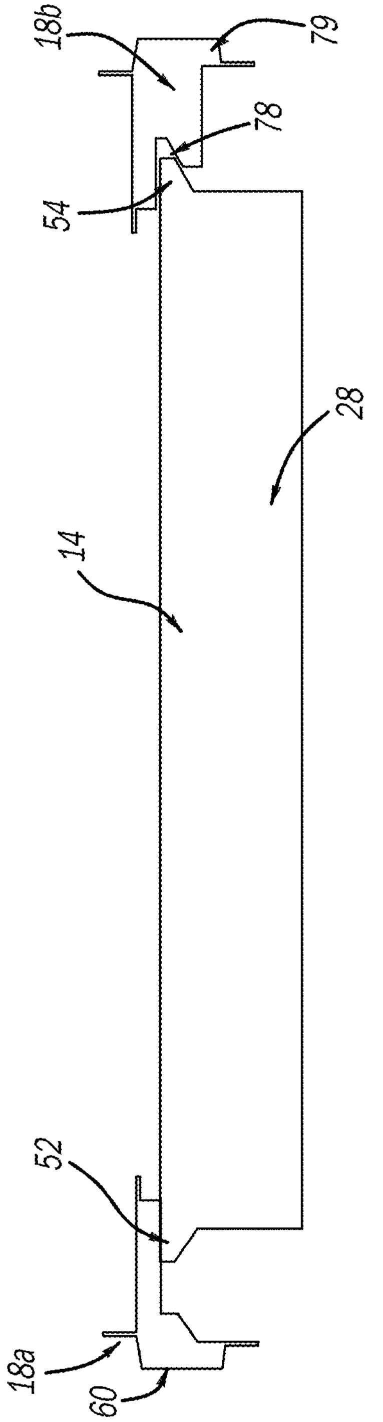

With reference to FIGS. 6A-6D and FIG. 7, a method 100 for assembling the battery housing assembly 14 to the vehicle frame 12 will be described in detail. At 104, the battery housing assembly 14 is moved into a space between the rail 18*a* of the vehicle frame 12 and the rail 18*b* of the vehicle frame 12 (FIG. 6A). At 108, the second tab 54 of the battery housing assembly 14 is inserted into the slot 78 of the rail 18*b* (FIG. 6B). The first tab 52 of the battery housing assembly 14 engages the lower surface 72 of the rail 18*a*, which may align the second tab 54 with the slot 78 of the rail 18*b*. In this way, the battery housing assembly 14 may be moved laterally toward the rail 18*b* so that the second tab 54 is received at least partially within the slot 78 of the rail 18*b*.

Figure 6C:
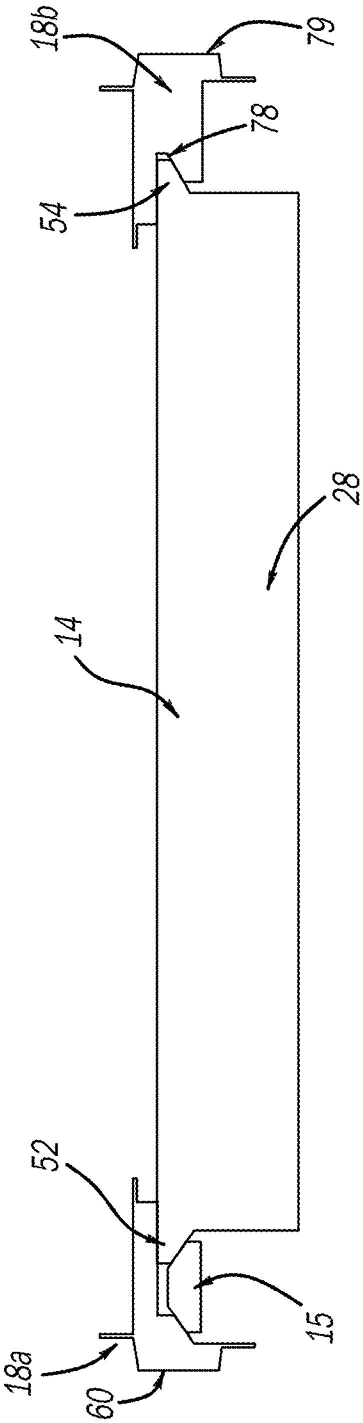
Figure 6D:
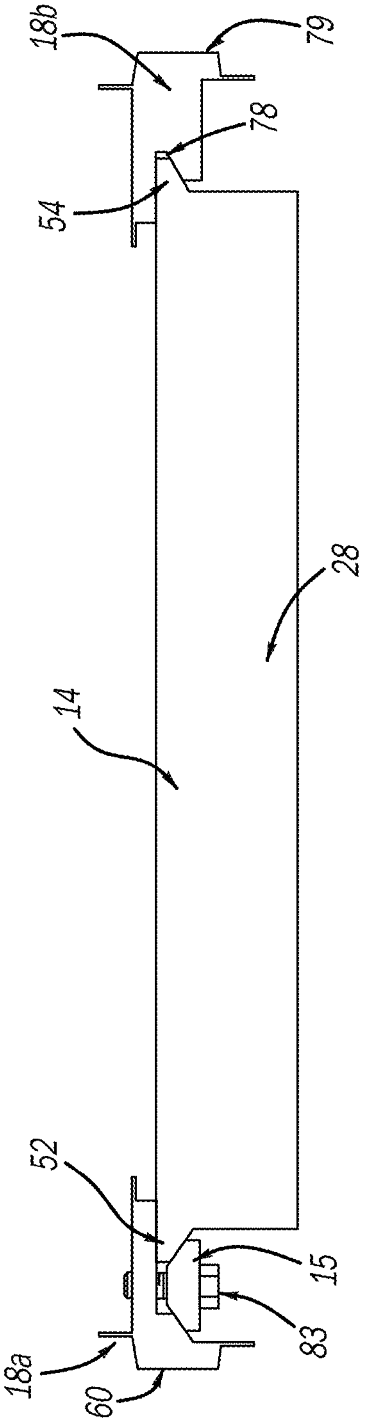
Figure 7:
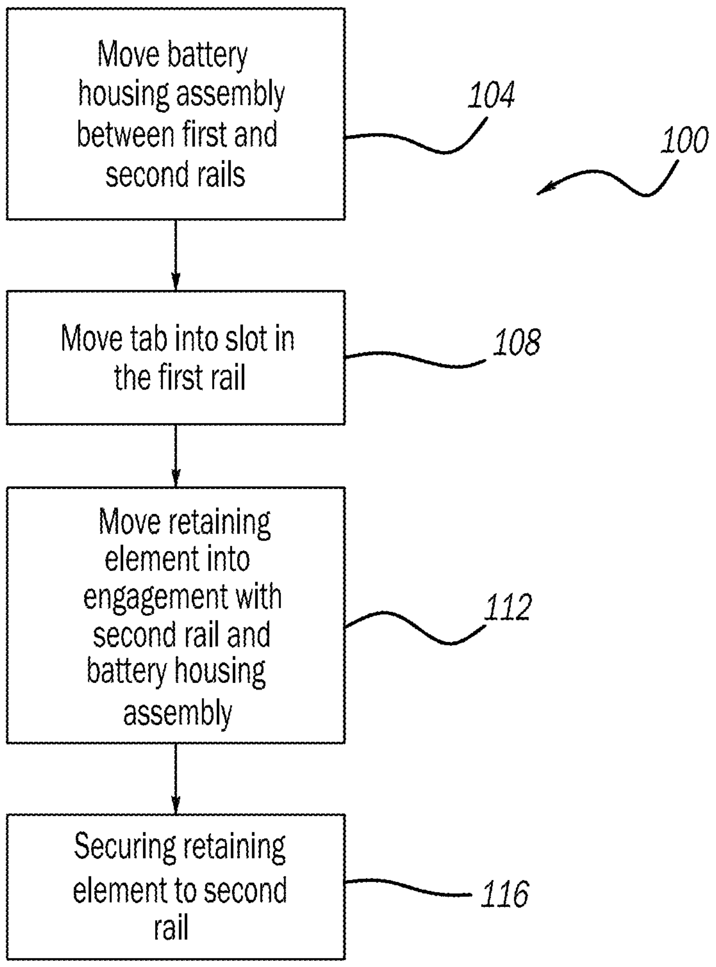
FIG. 7 is a flowchart illustrating a method for assembling a battery housing assembly to a vehicle frame according to the principles of the present disclosure.

At 112, the retaining element 15 is moved into engagement with the rail 18*a* and the battery housing assembly 14 (FIG. 6C). Stated differently, the retaining element 15 engages the rail 18*a* and the battery housing assembly 14 such that the one upper end portion 86 of the retaining element 15 contacts the inclined surface 58*c* of the tab 52 and the other upper end portion 86 of the retaining element 15 contacts the inclined surface 68*c* of the rail 18*a*. In this way, the retaining element 15 may force or urge the battery housing assembly 14 laterally such that the second tab 54 of the battery housing 28 moves further into the slot 78 of the rail 18*b* while the first tab 52 is securely retained between the retaining element 15 and the rail 18*a*. In some forms, the second tab 54 and the slot 78 may have an interference fit such that the second tab 54 is inhibited from being removed from the slot 78.

At 116, the retaining element 15 is secured to the rail 18*a* (FIG. 6D), which may further move the second tab 54 into the slot 78 of the rail 18*b*. In the example illustrated, the mechanical fasteners 83 extend through the retaining element 15 and the horizontal wall 64*b* of the rail 18*a*, thereby securing the retaining element 15 to the rail 18*a*. The present disclosure includes securing the retaining element 15 having a predetermined shape to the rail 18*a* using mechanical fasteners 83, which may further urge the second tab 54 into the slot 78, thereby retaining the tab 54 in the slot 78. In this way, the battery housing assembly 14 is coupled to the rail 18*b* without the use of mechanical fasteners, which reduces the number of mechanical fasteners used to secure the battery housing assembly 14 to the vehicle body frame 12.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for an electric vehicle; the structural assembly comprising:

a first longitudinal rail and a second longitudinal rail opposite the first longitudinal rail, the first longitudinal rail defining a slot;

a battery structure disposed between the first and second longitudinal rails and configured to house power storage units, the battery structure including a first tab extending laterally outwardly from a first side of the battery structure, the first tab received in the slot of the first longitudinal rail; and a retaining element engaging the second longitudinal rail and a second side of the battery structure and configured to secure the second side of the battery structure to the second longitudinal rail.

2. The structural assembly of claim 1, wherein the battery structure includes a battery tray and a lid secured to the battery tray.

3. The structural assembly of claim 1, further comprising a plurality of mechanical fasteners extending through the second longitudinal rail and the retaining element to secure the battery structure to the second longitudinal rail.

4. The structural assembly of claim 3, wherein the first longitudinal rail and the first tab do not include mechanical fasteners.

5. The structural assembly of claim 1, wherein a shape of the first tab corresponds to a shape of the slot.

6. The structural assembly of claim 1, wherein the retaining element extends an entire length of the battery structure.

7. The structural assembly of claim 1, wherein the battery structure includes a second tab extending laterally outwardly from the second side of the battery structure, and wherein the retaining element engages the second longitudinal rail and the second tab such that the second tab is disposed between the retaining element and the second longitudinal rail.

8. The structural assembly of claim 1, wherein the retaining element includes an upper portion that tapers inwardly.

9. The structural assembly of claim 8, wherein the battery structure includes a second tab extending laterally outwardly from a second side of the battery structure, and wherein the second tab includes an edge that corresponds to the tapered upper portion of the retaining element.

10. The structural assembly of claim 9, wherein the retaining element includes another upper end portion that tapers inwardly, and wherein the second longitudinal rail includes another edge that corresponds to the another tapered upper end portion of the retaining element.

11. A structural assembly for an electric vehicle; the structural assembly comprising:

a first longitudinal rail and a second longitudinal rail opposite the first longitudinal rail, the first longitudinal rail defining a slot;

a battery structure disposed between the first and second longitudinal rails and configured to house power storage units, the battery structure including a first tab extending laterally outwardly from a first side of the battery structure and a second tab extending laterally outwardly from a second side of the battery structure, the first tab received in the slot of the first longitudinal rail; and a retaining element engaging the second longitudinal rail and the second tab of the battery structure and configured to secure the second tab of the battery structure to the second longitudinal rail and the first tab of the battery structure to the first longitudinal rail, wherein the slot of the first longitudinal rail defines a lower inclined surface and the first tab includes an edge that corresponds to the lower inclined surface of the slot.

12. The structural assembly of claim 11, further comprising a plurality of mechanical fasteners extending through the second longitudinal rail and the retaining element to secure the battery structure to the second longitudinal rail.

13. The structural assembly of claim 11, wherein the first longitudinal rail and the first tab do not include mechanical fasteners.

14. The structural assembly of claim 11, wherein the retaining element engages the second longitudinal rail and the second tab such that the second tab is disposed between the retaining element and the second longitudinal rail.

15. The structural assembly of claim 11, wherein the retaining element includes an upper portion that tapers inwardly.

16. The structural assembly of claim 15, wherein the second tab includes an edge that corresponds to the tapered upper portion of the retaining element.

17. The structural assembly of claim 16, wherein the retaining element includes another upper end portion that tapers inwardly, and wherein the second longitudinal rail includes another edge that corresponds to the another tapered upper end portion of the retaining element.

18. A method for assembling a battery structure to a vehicle frame, the method comprising:

moving the battery structure into a space defined between a first longitudinal rail and a second opposing longitudinal rail of the vehicle frame;

inserting a first tab extending laterally outwardly from a first side of the battery structure into a slot defined in the first longitudinal rail;

moving a retaining element into engagement with the second longitudinal rail and a second side of the battery structure; and securing the retaining element to the second longitudinal rail.

19. The method of claim 18, wherein securing the retaining element to the second longitudinal rail moves the first tab further into the slot of the first longitudinal rail.

20. The method of claim 18, wherein securing the retaining element to the second longitudinal rail includes extending a plurality of mechanical fasteners through the second longitudinal rail and the retaining element.

* * * * *